Aug. 30, 1949.  S. B. BRYSON  2,480,546
POWER SAW FILING BENCH
Filed Jan. 28, 1947  2 Sheets-Sheet 1
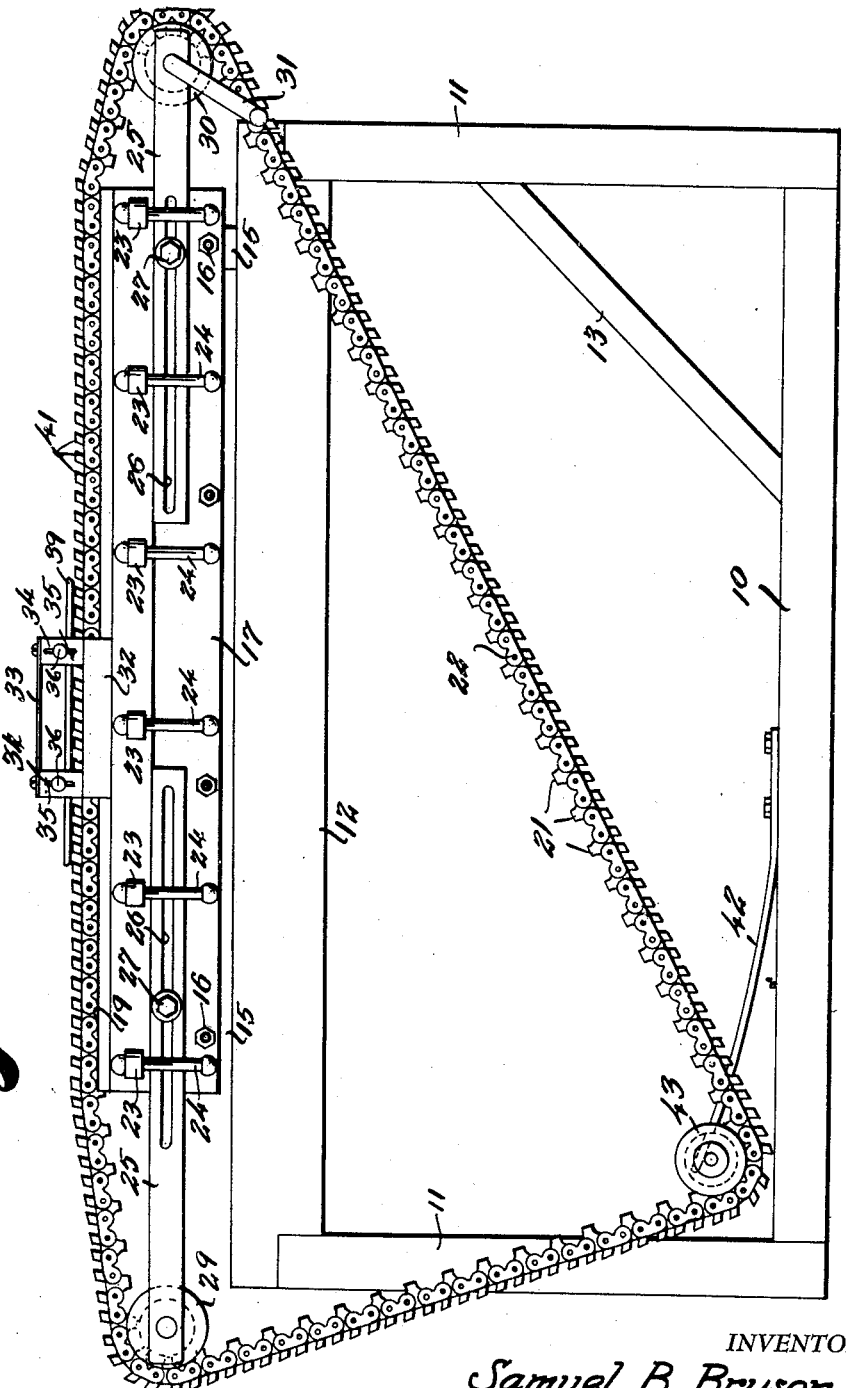
INVENTOR.
Samuel B. Bryson
BY Victor J. Evans & Co.
ATTORNEYS Aug. 30, 1949.  L. O. FRENCH  2,480,566
MOTOR SPEED CONTROLLER
Filed Jan. 17, 1947
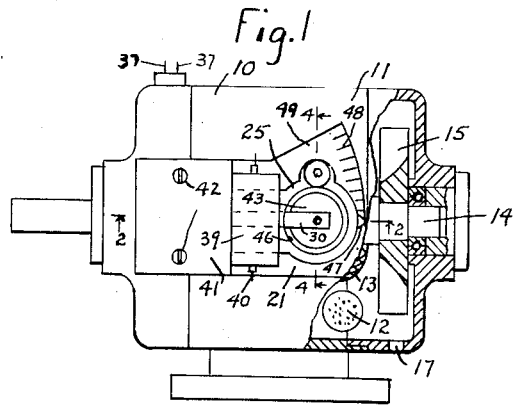
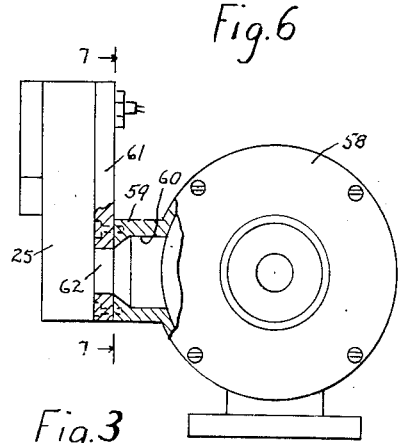
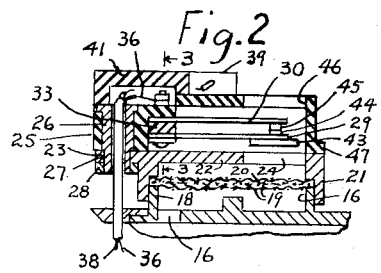
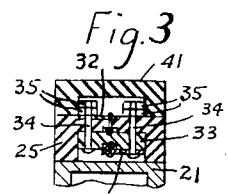
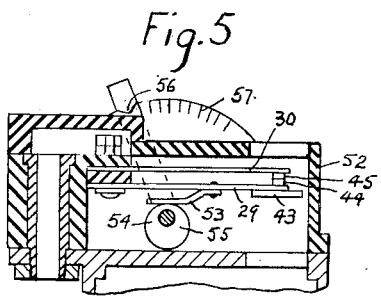
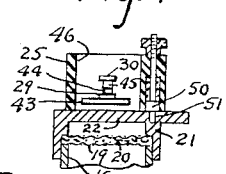
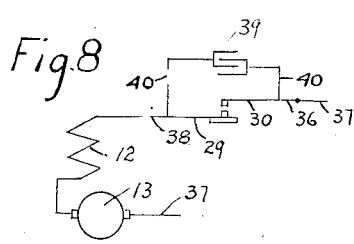
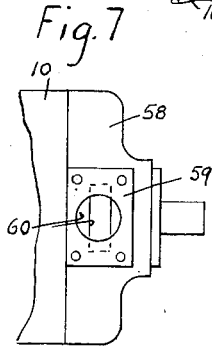
INVENTOR.
Louis O. French Patented Aug. 30, 1949

2,480,566

UNITED STATES PATENT OFFICE 2,480,566

MOTOR SPEED CONTROLLER

Louis O. French, Milwaukee, Wis.

Application January 17, 1947, Serial No. 722,604

6 Claims. (Cl. 318—335)

The invention relates to speed regulators for electric motors.

While the use of fluid pressure generated by a fan driven by a motor whose speed is to be controlled and operable on a circuit closure in a control circuit for the motor is not broadly new, the practical forms of such structures as heretofore proposed for use on small motors are relatively cumbersome and in most instances involve extensions of the length of the motor and special fan housings.

One object of the present invention is to simplify and improve speed regulators of the type above described by providing a speed regulator which may be readily applied to certain forms of motors currently in use without any alteration of the motor structure and may be applied to other standard type motors by providing a suitable mounting pad on one of the end caps of the motor at one of the ventilating passages thereof.

A further object of the invention is to provide a speed regulator in which the control switch mechanism is mounted on a movable support associated with either the inlet or outlet passage of the usual cooling system for the motor, so that the cooling air generated by the motor's fan will act on said switch to maintain the speed of the motor substantially constant and so that movement of said support relative to said opening will act to vary the speed of said motor.

This application is a continuation in part of my copending application Serial No. 713,162, filed November 29, 1946, now abandoned, for Motor speed regulator, as to claims for common subject matter.

The invention further consists in the several features hereinafter set forth and more particularly defined by claims at the conclusion hereof.

In the drawings:

Fig. 1 is a side elevation view of an electric motor equipped with a speed regulator embodying the invention, parts being broken away and parts being shown in section;

Fig. 2 is a vertical sectional view taken on the line 2—2 of Fig. 1, parts being broken away;

Fig. 3 is a detailed vertical sectional view taken on the line 3—3 of Fig. 2;

Fig. 4 is a detailed vertical sectional view taken on the line 4—4 of Fig. 1;

Fig. 5 is a view similar to Fig. 2 showing certain modifications;

Fig. 6 is an end view of a motor equipped with a speed regulator embodying the invention, parts being broken away and parts being shown in section;

Fig. 7 is a vertical sectional view taken on the line 7—7 of Fig. 6, parts being broken away;

Fig. 8 is a circuit wiring diagram.

Referring to Figs. 1 to 4 of the drawings, the numeral 10 designates an electric motor of known construction whose speed is to be regulated, said motor having a housing 11, field coils 12, armature 13, shaft 14, and suction fan 15 for drawing air through a screened inlet 16 communicating with one end of the motor, and after its passage through said motor expelling it through the outlet 17 at the other end of the motor. In this motor the inlet opening 16, formed in the body of the housing, has a raised rectangular flange 18 upon the top of which are placed a pair of screens 19 with filtering material 20 between them, and these parts are held in place by marginal metal frame fitting over said flange. Instead of the marginal screen retaining frame above referred to I provide a frame 21 fitting over said flange 18 and having a top cover portion 22 having an extension 23 and provided with an air inlet 24 spaced a suitable distance from the screens.

A support or arm 25 of insulating material has mounted therein a hollow pivot stud bolt 26 whose reduced threaded shank end passes through a pivot opening 27 in the extension 23 and carries a nut 28 whereby the outer end of said arm may be disposed either to one side of, over, or partially over said inlet 24. The arm is hollowed out to provide a space in which a pair of vibratory contact carrying members 29 and 30 are disposed and anchored at one of their ends in insulated spaced relation adjacent the pivotal mounting of said arm. As shown, the fixed end of the member 29 is riveted to a terminal plate 31, and the fixed end of the member 30 is riveted to a part of the arm and a terminal plate 32. An insulation block 33 is interposed between the members 29 and 30 and clamped to the arm by bolt conductor terminals 34 carrying terminal binding nuts 35. One of the terminals is connected by a conductor 36 passing down through the stud 26 and into the motor housing for connection with one of the socket plug terminals of one of the current supply wires 37. The other terminal 34 is connected by a conductor 38 passing down through said stud and into the motor housing for connection with the field coil 12, so that as shown in Fig. 8 the contact members 29 and 30 are in series with one of the supply wires 37, the other supply wire being connected to the armature 13, and a condenser 39 is connected across the terminals 34 by conductors 40. A cover plate 41 mounted over the terminals 34 is secured to the body of the arm by screws 42.

The member 29 carries a target or air impacting surface 43 of insulating material and of less area than the opening 24 and a contact 44. The member 30 carries a contact 45. Either one or both of the members 29 and 30 are biased toward the other, so that the contacts 44 and 45 normally engage. The arm 25 has an opening 46 alined with the center of the target which is preferably arranged close to the top of the inlet 16, so that the suction effect of the air drawn into the motor by the fan 15 will tend to move said target toward said inlet and separate the contacts 44 and 45. The hollowed out portion of the arm 25 is not absolutely essential to the operation of the device but is used mainly as a protective housing to prevent the operator's coming into contact with live switch parts.

The suction effect above referred to is varied by exposing more or less of the target to the effect of the suction pressure at said inlet by shifting said arm 25 to different angular positions. Thus when the target is in the position shown in Fig. 1, it will get the full suction effect while if it is moved so that the target is to one side of said inlet 16, no suction effect on the target will be produced and the contacts 44 and 45 will remain in engagement. The frame 21 with the arm 25 may be readily removed from the flange 18 as a unit in case it is necessary to renew the filter 20.

While the inlet opening 24 is shown as of less area than the inlet opening 16 so as to restrict the flow of air at the opening 24 and thus increase its velocity, where the suction force is sufficient, the opening 24 may be made substantially coextensive with the opening 16 except for a marginal edge screen retaining portion.

With the above arrangement when current is supplied to the line wires 37, the motor is started and the cooling fan 15 set in motion to draw cooling air through the motor, and some of the air entering the inlet opening 24 or 16 is drawn through the opening 46 in the arm 25 and past the target 43, the suction effect of this air overcoming the normal closing bias of the members 28 and 29 and causing the contacts 44 and 45 to separate, thus opening the current supply circuit to the motor and reducing its speed until the reduced suction effect permits the contacts to again engage. This action is rapidly repeated with the result that the speed of the motor is maintained substantially constant for any given suction effect on the target 43. If then the arm is moved from its low speed position shown in Fig. 1 to a position in which the target only partially overlaps the opening 24 or 16, the suction effect will be reduced and the speed of the motor will be increased until finally when the target 43 is moved completely out of the influence of the suction effect of the fan 15, the contacts 28 and 29 will remain closed and the motor will run at its highest speed.

The arm 25 may be provided with an index pointer 47 cooperating with a speed indicating scale 48 marked on an extension 49 of the frame 21. Also in those instances in which the motor is used to drive interchangeable elements in which it would be dangerous to drive certain of these elements at the highest motor speed, means may be provided to appraise the operator that he is moving the arm 25 into the higher speed zone, so that he will realize this fact, and for this purpose the arm 25 may be provided with a spring pressed detent 50 which is adapted to engage in an opening 51 in the frame 21 before the arm 25 can be shifted into the higher motor speed positions, so that the operator cannot simply swing arm 25 from the lower speed position to the higher speed position without thinking since it will be necessary for him to release the detent 50 from the frame 21 before he can move said arm into its higher speed positions.

Other forms of mounting the arm 25 for shifting movement of the speed controlling mechanism may be used, for example, the arm 25 may be pivoted to swing in a plane normal to inlet opening or it may be slidably mounted on guides associated with the frame 21.

Some advantages of the invention may also be realized where a casing 52 corresponding to the arm 25 is fixed to the top of the frame 21 and the changes in speed are effected by adjusting the biasing pressure on the contact 29 by providing a flat spring 53 secured to said contact 29 and engaging a tension adjusting cam 54 of insulating material mounted on a rotary or oscillatory control shaft 55 journalled in the casing 52 and carrying a crank arm provided with a pointer 56 working over a scale 57 on said casing. The spring 53 is preferably a weaker spring than the contact carrying member 29, and the adjustment of the cam 54 increases the tension of said spring 53, and therefore, augments the biasing pressure between the contacts 44 and 45. The shiftable mounting of the frame, however, is preferred as very fine adjustments of speed changes may be effected.

For those motors in which the ventilating openings for the cooling system of the motor are disposed in the end caps of the motor housing, one of these end caps 58, shown in Fig. 7, may have a pad portion 59 formed adjacent its ventilating opening 60 to receive a plate 61 having an opening 62 communicating with the opening 60 and upon which the arm 25 with the associated switch mechanism such as previously described may be mounted. The opening 60 may be either the inlet or outlet opening for the motor ventilating system. If it is the inlet opening, the switch elements are arranged as shown in Fig. 2. If it is the outlet opening so that the discharge pressure of air generated by the fan 15 is used, then the target 43 is mounted on the contact member 45 instead of the member 44, and the shifting of the arm 25 relative to said outlet will act in the same way to vary the speed of the motor.

It is to be noted that while the air operated means has been shown as a target 43 carried by one of the contact carrying members for operating the motor speed controlling switch because this provides a very simple arrangement, said target may be mounted on a member operatively connected to one of said contact carrying members, if desired.

The mounting of the speed controlling switch mechanism at the inlet opening to the motor's cooling system for shifting movement relative to said opening is the preferred form of the invention, for by it the motor's speed may be controlled from a slow speed at which it is just turning to its highest rated speed and gradually advanced through this speed range, thus providing in effect a continuously variable speed drive from the motor shaft.

I desire it to be understood that this invention is not to be limited to any particular form or arrangement of parts except in so far as such limitations are included in the claims.

What I claim as my invention is:

1. In a speed regulator for an electric motor having a cooling system including a fan driven by the motor and inlet and outlet passages for the air circulated by said fan, the combination of a circuit closure for controlling the speed of said motor mounted exteriorly thereof, means exterior of said motor and operable by air circulated by said fan for operating said closure to maintain the speed of the motor substantially constant, and means for movably supporting said closure and its operating means as a unit adjacent one of said passages for movement relative thereto for varying its operation to vary the speed of said motor.

2. In a speed regulator for an electric motor having a cooling system including a fan driven by the motor and inlet and outlet passages for the air circulated by said fan, the combination of a circuit closure for controlling the speed of said motor mounted exteriorly thereof, means exterior of said motor and operable by air circulated by said fan for operating said closure to maintain the speed of the motor substantially constant, and a support for said closure and its operating means pivotally mounted as a unit adjacent one of said passages for shifting said means relative to said passage for varying its operation to vary the speed of said motor.

3. In a speed regulator for an electric motor having a cooling system including a fan driven by the motor and inlet and outlet passages for the air circulated by said fan, the combination of a circuit closure comprising a pair of vibratory contact carrying members for controlling the speed of the motor, a support provided with an air passage and movably mounted adjacent one of said passages and carrying said closure for variably positioning its air passage relative to said passage in said motor, and an air sensitive target positioned in the passage on said support and mounted on one of said contact members for moving this member relative to the other under the air flow effect produced by the fan.

4. In a speed regulator for an electric motor having a cooling system including a fan driven by the motor and inlet and outlet passages for the air circulated by said fan, the combination of means for controlling the speed of said motor, means operable by air circulated by said fan for operating said speed controlling means, means for movably supporting said operating means at one of said passages for varying its operation to vary the speed of said motor, and manually releasable stop means associated with said last named means to prevent accidental movement of said supporting means into a higher speed range.

5. In a speed regulator for an electric motor having a cooling system including a fan driven by the motor, the combination of a circuit closure for controlling the speed of said motor, means operable by air circulated by said fan for operating said closure to maintain the speed of the motor substantially constant, means for varying the operative effect of the air stream generated by the fan upon said closure operating means to vary the speed of said motor, and manually releasable stop means associated with said last named means to prevent its accidental movement into a higher speed range.

6. An electric motor, a fan mounted on the shaft of said motor, a pair of vibratory arms carrying contacts at their outer end portions, each of which may vibrate freely relative to the other and one of which carries an air sensitive target tending to displace the same relative to each other, said contact carrying arms being in a control circuit for the motor and cooperating to maintain the speed of the motor substantially constant, said contact carrying arms being mounted for movement as a unit for varying the action of the air flow produced by said fan on said target to vary the speed of the motor.

LOUIS O. FRENCH.

REFERENCES CITED

The following references are of record in the file of this patent:

UNITED STATES PATENTS

| Number | Name | Date |
| --- | --- | --- |
| 2,092,955 | Chamberlain | Sept. 14, 1937 |
| 2,292,567 | Jordan | Aug. 11, 1942 |
| 2,312,241 | Drackenberg | Feb. 23, 1943 |
| 2,425,178 | Ellerbeck | Aug. 5, 1947 |